(12) United States Patent
Alapati et al.

(10) Patent No.: US 10,241,834 B2
(45) Date of Patent: Mar. 26, 2019

(54) BANDWIDTH AWARE RESOURCE OPTIMIZATION

(71) Applicant: INTERNATIONAL BUSINESS MACHINES CORPORATION, Armonk, NY (US)

(72) Inventors: Sangram Alapati, Austin, TX (US); Hima B. Nimmagadda, Hyderabad (IN); Satish K. Sadasivam, Tamilnadu (IN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/362,878

(22) Filed: Nov. 29, 2016

(65) Prior Publication Data

US 2018/0150333 A1 May 31, 2018

(51) Int. Cl.
*G06F 9/46* (2006.01)
*G06F 15/173* (2006.01)
(Continued)

(52) U.S. Cl.
CPC .......... *G06F 9/50* (2013.01); *G06F 9/48* (2013.01); *G06F 9/485* (2013.01); *G06F 9/4843* (2013.01); *G06F 9/4881* (2013.01); *G06F 9/4893* (2013.01); *G06F 9/5005* (2013.01); *G06F 9/505* (2013.01); *G06F 9/5011* (2013.01);
(Continued)

(58) Field of Classification Search
CPC .......... G06F 9/48; G06F 9/4843; G06F 9/485; G06F 9/4881; G06F 9/4893; G06F 9/50; G06F 9/5005; G06F 9/5011; G06F 9/5016; G06F 9/5022; G06F 9/5027;
(Continued)

(56) References Cited

U.S. PATENT DOCUMENTS 8,347,301 B2     1/2013  Li et al.
8,356,304 B2 *   1/2013  El-Moursy ............ G06F 9/4881
                                                  714/49

(Continued)

OTHER PUBLICATIONS

Peternier et al., "Improving Execution Unit Occupany on SMT-based Processors through Hardware-aware Thread Scheduling", Future Generation Computer Systems, May 16, 2013, pp. 1-35.
(Continued)

*Primary Examiner* — Charles M Swift
(74) *Attorney, Agent, or Firm* — Robert C. Bunker

(57) ABSTRACT

An application workload is scheduled for execution by each of one or more processing cores operating in a first mode. Performance metrics for the each of the one or more processing cores and a memory component are monitored, wherein the memory component stores data necessary for the one or more processing cores to carry out instructions to complete the scheduled workload. If performance metrics are greater than a specified threshold, a number of the one or more processing cores handling the scheduled workload is reduced. If the performance metrics are not greater than the specified threshold, whether each of the processing cores of the processor is currently handling a scheduled workload is determined. If each of the processing cores of the processor is currently handling the scheduled workload, the processor is configured to operate in a second mode.

17 Claims, 6 Drawing Sheets

(51) Int. Cl.
*G06F 9/50* (2006.01)
*G06F 9/48* (2006.01)

(52) U.S. Cl.
CPC .......... *G06F 9/5016* (2013.01); *G06F 9/5022* (2013.01); *G06F 9/5027* (2013.01); *G06F 9/5044* (2013.01); *G06F 9/5055* (2013.01); *G06F 9/5066* (2013.01); *G06F 9/5083* (2013.01); *G06F 9/5094* (2013.01); *G06F 2209/501* (2013.01)

(58) Field of Classification Search
CPC ...... G06F 9/5044; G06F 9/505; G06F 9/5055; G06F 9/5066; G06F 9/5083; G06F 9/5094
See application file for complete search history.

(56) References Cited

U.S. PATENT DOCUMENTS

| | | | |
|---|---|---|---|
| 8,832,479 B2 | 9/2014 | Elnozahy et al. | |
| 8,898,435 B2 | 11/2014 | Merchant et al. | |
| 2006/0218557 A1* | 9/2006 | Garthwaite | G06F 9/5016 718/105 |
| 2007/0300227 A1* | 12/2007 | Mall | G06F 9/3851 718/102 |
| 2008/0022285 A1* | 1/2008 | Cherkasova | G06F 9/505 718/104 |
| 2009/0328055 A1* | 12/2009 | Bose | G06F 1/3203 718/105 |
| 2012/0216030 A1* | 8/2012 | Fontenot | G06F 9/3851 713/100 |
| 2013/0290751 A1* | 10/2013 | Mondal | G06F 1/3206 713/320 |
| 2013/0332778 A1* | 12/2013 | Spracklen | G06F 11/3409 714/47.1 |
| 2014/0059553 A1* | 2/2014 | Chandhoke | G06F 9/4843 718/102 |
| 2014/0095691 A1 | 4/2014 | Ganguli et al. | |
| 2016/0179184 A1* | 6/2016 | Shah | G06F 1/3296 713/320 |

OTHER PUBLICATIONS

Settle et al., "Architectual Support for Enhanced SMT Job Scheduling", Proceedings of the 13th International Conference on Parallel Architecture and Compilation Techniques (PACT'04), IEEE, pp. 1-11.

Koukis et al., "Memory and Network Bandwith Aware Scheduling of Multiporgammed Workloads on Clusters of SMPs", Proceedings of the 12th International Conference on Parallel and Distributed Systems (ICPADS'06), 2006 IEEE, pp. 1-10.

Mell et al., "The NIST Definition of Cloud Computing", National Institute of Standards and Technology, Special Publication 800-145, Sep. 2011, pp. 1-7.

Xu et al., "On Mitigating Memory Bandwidth Contention through Bandwidth-Aware Scheduling", PACT'10, Sep. 11-15, Vienna, Austria, 2010 ACM, pp. 237-247.

* cited by examiner

US 10,241,834 B2

BANDWIDTH AWARE RESOURCE OPTIMIZATION

FIELD OF THE INVENTION

The present invention relates generally to the field of scheduling workloads in a cloud computing environment, and more particularly managing resource utilization and bandwidth availability.

SUMMARY

Embodiments of the present invention provide systems, methods, and computer program products for bandwidth aware resource optimization. An application workload is scheduled for execution by each of one or more processing cores operating in a first mode, wherein a number of threads in each of the one or more processing cores executes the scheduled workload in accordance with the first mode. Performance metrics for the each of the one or more processing cores and a memory component are monitored, wherein the memory component stores data necessary for the one or more processing cores to carry out instructions to complete the scheduled workload. Responsive to determining that the performance metrics are greater than a specified threshold, a number of the one or more processing cores handling the scheduled workload is reduced. Responsive to determining that the performance metrics are not greater than the specified threshold, whether each of the processing cores of the processor is currently handling a scheduled workload is determined. Responsive to determining that each of the processing cores of the processor is currently handling the scheduled workload, the processor is configured to operate in a second mode, wherein the number of threads in each of the one or more processing cores executes the scheduled workload in accordance with the second mode.

DETAILED DESCRIPTION

Figure 1A:
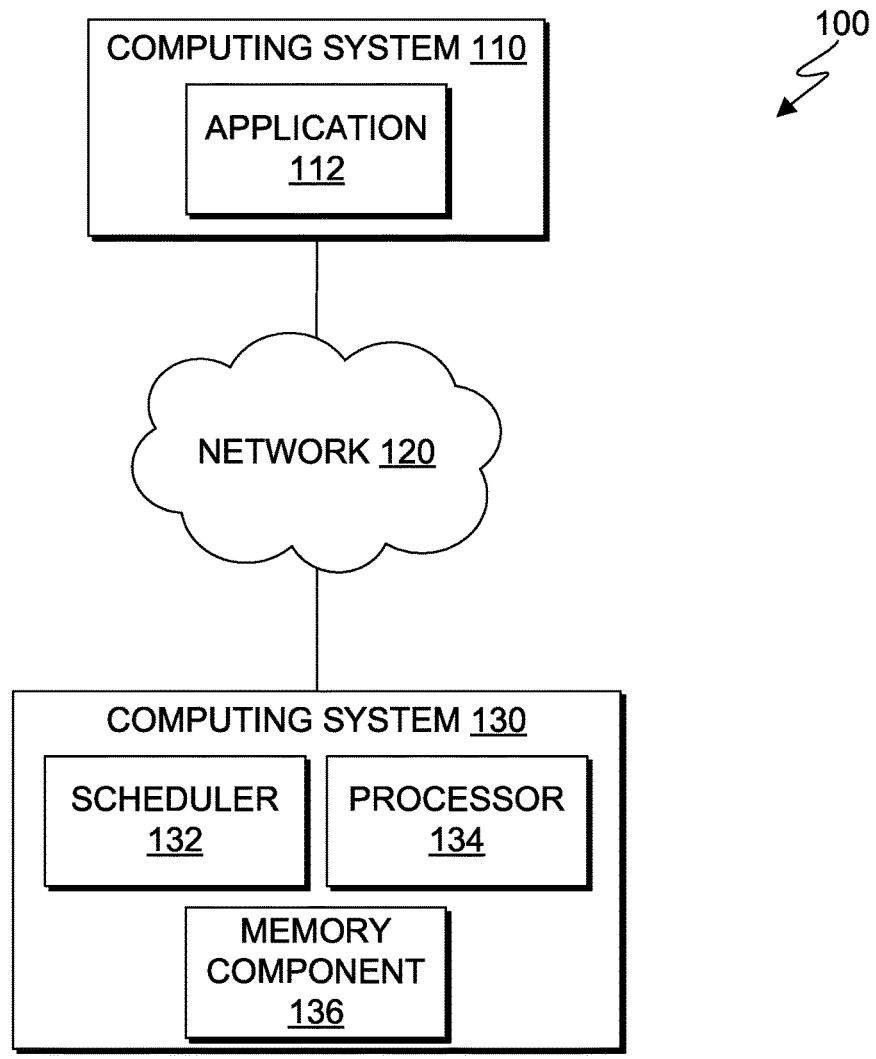
FIG. 1A is a block diagram of a cloud computing environment, in accordance with an embodiment of the present invention.

A cloud computing environment may implement shared-memory multiprocessor computing systems for running one or more applications. The one or more applications may involve executing jobs, tasks or various workloads which may classified as memory intensive workloads (i.e., workloads that have a greater rate of input/output (I/O) requests to a shared-memory component) or non-memory intensive workloads (i.e., workloads that have a lesser rate of I/O requests to the shared-memory component). Both types of workloads may be scheduled by a scheduler and handled by the computing systems of the cloud computing environment to carry out necessary functions of the one or more applications.

Various advancements in processor technology, such as out-of-order instruction execution, multi-threading within a processing core, and prefetching, help increase the performance of processing cores when handling workloads. For example, hyper-threading or simultaneous multithreading (SMT) may be a technique to enable execution of multiple processes or threads concurrently. A processor implementing SMT may be configured to perform instruction level parallelism (ILP) and thread level parallelism (TLP) at the same time by issuing multiple instructions from multiple threads in a single cycle, whereby improving the processor's performance while handing workloads.

Although such advancements in processor technology may improve the processor's performance in handling workloads, a shared-memory component may undergo a decrease in performance if the processor is handling memory intensive workloads. For example, a processor implementing SMT may be capable of performing a greater number of instructions per cycle (IPC) while handling a memory intensive workload. In this example, if an SMT processor performs a greater number of IPC's while handling a particular workload, then the SMT processor may require a faster rate of access to necessary data for completing the instructions. Furthermore, a shared-memory component may receive an increased number of I/O requests per cycle to provide the SMT processor with access to the necessary data for completing instructions, whereby decreasing performance of the shared-memory component and may reduce the available bandwidth the access the shared-memory component. Additionally, the shared-memory component may undergo an increased amount of storage resource contention from the processor that is handling multiple processes simultaneously for the workloads, which also reduces performance in the shared-memory component and reduces the available bandwidth the access the shared-memory component. Accordingly, the available bandwidth to access the shared-memory component (i.e., memory bandwidth) may be performance bottleneck in such cloud computing environments, whereby resulting in decreased scalability and performance when handling workloads by the cloud computing environment.

Embodiments of the present invention provide methods, systems, and computer program products for scheduling workloads in a cloud computing environment to optimize resource utilization. Embodiments of the present invention reduce a number of processing cores utilized while handling a workload by adjusting an operating configuration of the processor.

FIG. 1A is a block diagram of cloud computing environment 100, in accordance with an embodiment of the present invention. Cloud computing environment 100 includes computing system 110 and computing system 130, interconnected by network 120. In this embodiment, cloud computing environment 100 includes one computing system 130. In another embodiment, cloud computing environment 100 may include any number of nodes, similar to that of computing system 130. In yet another embodiment, a non-cloud computing environment may be implemented in place of cloud computing environment 100, whereby embodiments of the present invention may be applied to facilitate workload consolidation and an improved performance-per-watt.

Computing system 110 and computing system 130 represent platforms of cloud computing environment 100. Computing systems 110 and 130 may be desktop computers, laptop computers, specialized computer servers, or any other computer system known in the art. In certain embodiments, computing systems 110 and 130 may represent computer systems utilizing clustered computers and components to act as a single pool of seamless resources when accessed through network 120. For example, such embodiments may be used in data center, cloud computing, storage area network (SAN), wide area network (WAN), and network attached storage (NAS) applications. In certain embodiments, computing systems 110 and 130 represent virtual machines. In general, computing systems 110 and 130 are representative of any electronic device, or combination of electronic devices, capable of executing machine-readable program instructions, in accordance with an embodiment of the present invention, as described in greater detail with regard to FIG. 4. In this embodiment, computing systems 110 and 130 are implemented in various cloud computing environments, as described in greater detail with regard to FIGS. 5 and 6.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computing system 110 and computing system 130, in accordance with an embodiment of the invention.

Computing system 110 represents a platform configured to execute application 112. Application 112 is a computer program configured to perform a group of coordinated functions, tasks, or activities, such as for example, application suites, enterprise software, content access software, educational software, media development software, product engineering software, entertainment software, etc. In one example, application 112 may be a supply chain management software used to provide inventory status updates. In this one example, if application 112 were to provide the inventory status updates, then performing specified workloads may be necessary, as described in greater detail below.

Computing system 130 represents a platform configured to schedule and perform workloads for application 112. In this embodiment, computing system 130 includes scheduler 132, processor 134, and memory component 136. As previously described, although one computing system 130 is depicted in FIG. 1A, more than one computing system 130 may be implemented in cloud computing environment 100 to handle workloads for application 112. In one embodiment, scheduler 132 and memory component 136, may each be part of separate platforms. For example, one platform may be a master node configured to operate scheduler 132. In another example, memory component 136 may be part of a shared storage repository, whereby other platforms or nodes of cloud computing environment 100 may access data stored on memory component 136 through network 120.

Scheduler 132 represents a workload automation application configured to plan, execute and track workloads on computing system 130. For example, scheduler 132 may be an application that is part of the IBM Tivoli® workload automation product family. In one embodiment, scheduler 132 may be operatively coupled with computing system 110 via network 120, such that scheduler 132 is able to schedule workloads for application 112. In another embodiment, scheduler 132 may be part of the same platform as application 112 (e.g., computing system 110) to plan, execute and track workloads on other nodes of cloud computing environment 100 (e.g., computing system 130). For example, scheduler 132 may receive a list of workloads submitted for application 112, select a workload from the workload queue, and then identify a particular computing system (e.g., computing system 130) to schedule the workload for execution. In this example, the workload is initially scheduled for execution in an ST mode, and over an interval of time scheduler 132 monitors the performance behavior of various components to determine whether to change the SMT modes, such that more threads are utilized (e.g., SMT2, SMT4, etc.).

Scheduler 132 may be part of another application program that designates an operating configuration or mode of processor 134, as described in greater detail below. Furthermore, scheduler 132 may be part of another application program operable to monitor various performance metrics of processor 134 and memory component 136 while handling workloads for application 112, as described in greater detail below. For example, scheduler 132 may be configured to monitor memory latency cycles, memory bandwidth, and IPC's performed while handing a particular workload. A memory latency cycle may be a delay time between a moment a memory controller or storage controller of memory component 136 instructs a memory module to access a particular data record, and the moment the data record in the given memory location becomes available to processor 134. As previously described, the memory bandwidth is the available bandwidth to access memory component 136, and IPC's are the number of instructions performed in a cycle by processor 134.

Processor 134 represents a hardware component configured to carry out instructions of a computer program by performing arithmetic, logical, control, and I/O operations specified by the instructions. Processor 134 may be a hardware component that is part of a family of superscalar multiprocessors such as, for example, IBM POWER7®, as described in greater detail with regard to FIG. 1B. In certain embodiments where more than one computing system 130 is implemented by cloud computing environment 100, each of the more than one computing system 130 includes processor 134 to complete distributed computational workloads.

Memory component 136 represents a storage repository configured to store data necessary for processor 134 to carry out instructions for scheduled workloads. A storage controller of memory component 136 may receive I/O requests from processor 134 and complete the I/O requests by writing data to and/or reading data from memory component 136. As previously described, memory component 136 may be part of a shared storage repository in instances where more than one computing system 130 is implemented by cloud computing environment 100. Furthermore, memory component 136 may be part of a SAN and/or NAS configurations, as previously described.

The descriptions of the various embodiments of the present invention have been presented for the purposes of illustration, but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. For example, a greater number of computing systems similar to that of computing system 130 may be implemented in cloud computing environment 100. Furthermore, more than one processor 134 may be in computing system 130. In another example, more than one application 112 may be operating on one or more computing systems similar to that of computing system 110. In yet another example, more than one memory component 136 may be part of computing system 130 or separate from computing system 130, such that computing system 130 may access data stored on memory component 136 using network 120, as previously described.

Figure 1B:
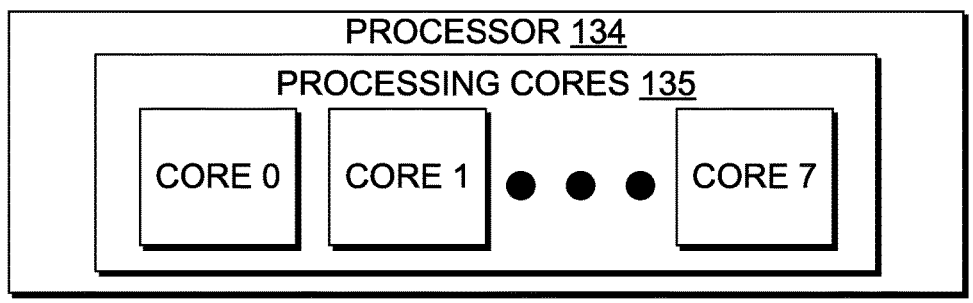
FIG. 1B is a block diagram of a processor implemented by a computer system of the cloud computing environment, in accordance with an embodiment of the present invention.

FIG. 1B is a block diagram of processor 134 implemented by computing system 130 of cloud computing environment 100, in accordance with an embodiment of the present invention. Processor 134 may be a processor that includes a number of processing cores 135, such as IBM POWER7®, may utilize a technique to execute multiple processes or threads concurrently, such as simultaneous multithreading (SMT) or hyper-threading. As previously described, SMT facilitates ILP and TLP at the same time, by being capable of issuing multiple instructions from multiple threads in a single cycle. In this embodiment, different SMT configurations may be implemented by processor 134, including: a single-threaded (ST) configuration or mode, 2 SMT threads executing on each processing core 135 (SMT2), and 4 SMT threads executing on each processing core 135 (SMT4). Processor 134 may be configured to run either in ST mode, SMT2 or SMT4 mode, where processing cores 135 of processor 134 are connected to a number of memory controllers having a specified number of channels and providing a particular memory bandwidth. In this embodiment, processor 134 is an 8-core chip (e.g., 8 processing cores 135), with each processing core 135 capable of simultaneously executing 4 threads, and each processing core 135 includes 12 execution units. Furthermore, the 8 processing core 135 of processor 134 are connected to 2 memory controllers, whereby each of the memory controllers has 4 channels of double data rate three (DDR3) memory, providing 100 GB/s of memory bandwidth. In another embodiment, processor 134 may be an IBM POWER8® which may be configured to execute workloads in an SMT8 mode, such that 8 SMT threads are executing on each processing core 135.

In one example, a test on processor 134 may be performed to measure throughput and bandwidth characteristics of a particular benchmark (e.g., SPEC CPU2006 benchmarks), with varying number of copies of the benchmark in the three SMT configurations. In this example, an observed load on processor 134 is increased incrementally by running an increased number of copies of the benchmark. Results for the test may indicate that, for a number of workloads the memory bandwidth saturates after a certain number of copies of the benchmark are executed, and the performance scaling of processor 134 may be achieved until bandwidth saturation begins to taper off after the bandwidth saturation point. Furthermore, adjusting the SMT configuration (i.e., changing or consolidating a load on a lesser number of processing cores 135 by utilizing the processor's SMT capabilities) from an ST configuration to an SMT configuration at or beyond a bandwidth saturation point may result in minimal loss in performance as well as making a number of processing cores 135 available for other workloads.

Figure 2:
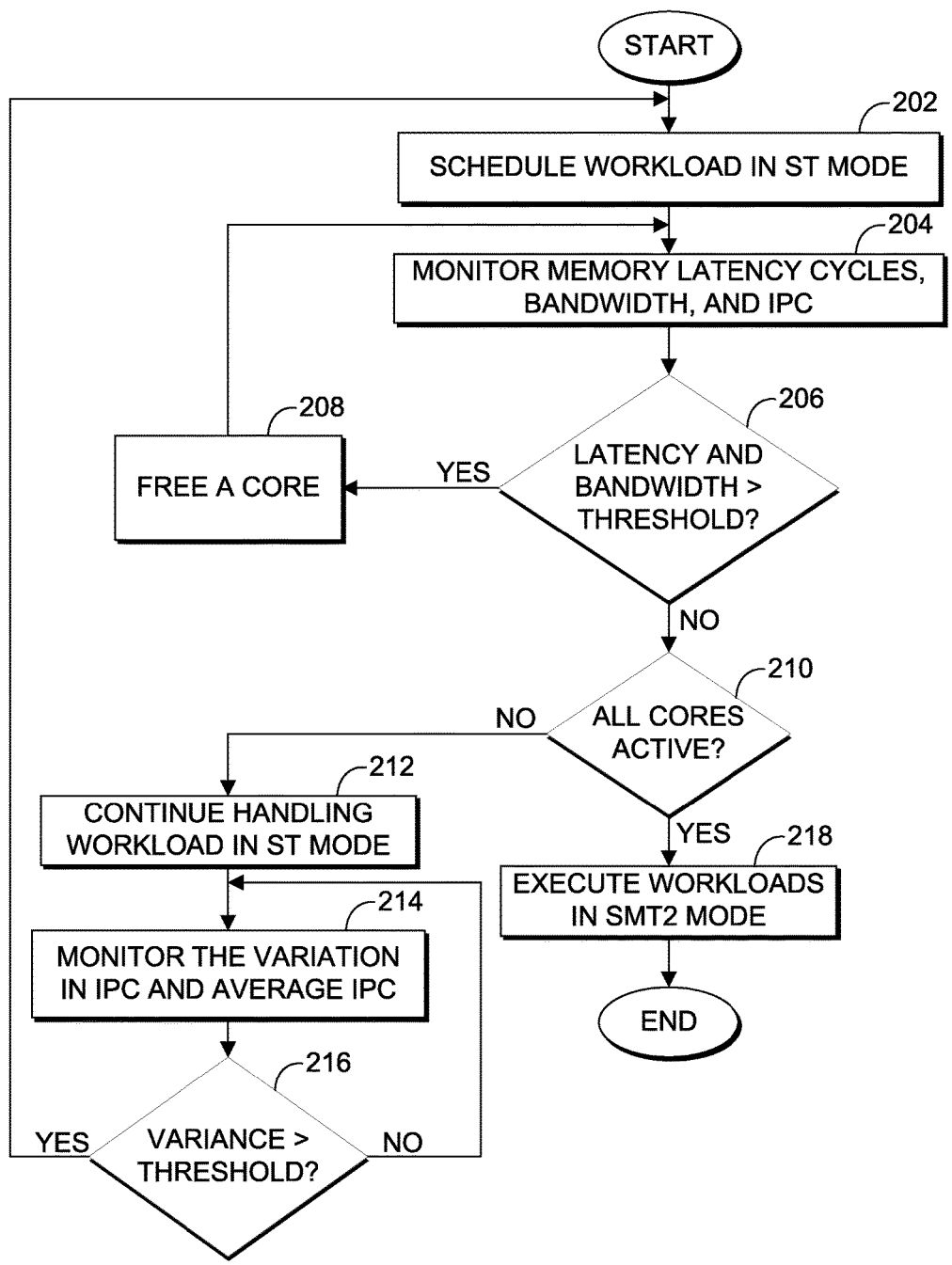
FIG. 2 is a flowchart illustrating operational steps for executing a workload in the cloud computing environment, in accordance with an embodiment of the present invention.

FIG. 2 is a flowchart illustrating operational steps for executing a workload in cloud computing environment 100, in accordance with an embodiment of the present invention. Scheduler 132 schedules a workload for application 112 for execution in a ST mode or configuration by processor 134 (step 202). As previously described, scheduler 132 may be part of another application program operable to allocate and monitor various hardware resources to schedule and execute workloads. For example, scheduler 132 may communicate with processor 134 indicating that the scheduled workload is to be performed by processing cores 135 in a ST configuration, whereby a single-threaded process for handling the scheduled workload may be executed on each of processing cores 135. Once the workload for application 112 is scheduled, scheduler 132 monitors memory latency cycles, memory bandwidth, and a number of IPC's performed while handling the scheduled workload (step 204). Scheduler 132 determines whether the monitored memory latency and memory bandwidth is greater than a memory latency threshold for a memory bandwidth threshold, respectively (decision 206). A memory latency threshold may be based on a specified or predetermined number of average cycles it takes for data to reach processing core 135 from memory component 136. If it is determined that a monitored memory latency is greater than a specified memory latency threshold, then this may indicate that a memory controller of memory component 136 undergoes heavy resource contention to facilitate necessary I/O operations for handling the workload. In one embodiment, if the monitored metric values (i.e., memory latency and memory bandwidth) is greater than their respective specified threshold, then the scheduled workload may be a memory intensive workload. In another embodiment, if the monitored metric values are not greater than their respective specified threshold, then the scheduled workload may be a computational intensive workload.

If, scheduler 132 determines that the monitored memory latency and memory bandwidth is greater than the specified threshold for the memory latency and the memory bandwidth ('yes' branch, decision 206), then scheduler 132 indicates to processor 134 to free one of processing cores 135 (i.e., make available), such that the one of processing cores 135 will not continue handling the current workload, until indicated otherwise (step 208). Stated differently, one of the processing core 135 is marked or indicated as a free, whereby terminating any workload tasks for the currently scheduled workload executed on the free processing core 135.

For example, in step 202 scheduler 132 schedules application 112 workloads in all processing cores 135 (e.g., 8 cores in a POWER7® processor) in an ST mode. If, in decision 206, it is determined that various performance metrics exceed specified thresholds, then scheduler 132 will allocate one of processing cores 135 or free up one of processing cores 135. Stated differently, in embodiments where processor 134 is an IBM POWER7® processor, scheduler 132 may schedule application 112 workloads in all 8 processing cores 135. If in this example, the memory latency threshold is exceeded then scheduler 132 will reduce the number of processing cores 135 handling the scheduled workload, such that now 7 processing cores 135 handle the scheduled workload. Furthermore, scheduler 132 may iteratively reduce a number of processing cores 135 to handle application 112 workloads until a monitored memory latency is below the specified memory latency threshold.

If, scheduler 132 determines that the monitored memory latency and memory bandwidth is not greater than the specified threshold for the memory latency and the memory bandwidth ('no' branch, decision 206), then scheduler 132 determines whether all processing cores 135 are actively handling a scheduled workload (decision 210). In one embodiment, scheduler 132 may maintain a data structure (e.g., a table) that identifies each of processing cores 135 and whether they are actively handling a scheduled workload, as well as identifying the scheduled workload with a particular identifier, and a completion status of the scheduled workload. For example, scheduler 132 initially indicates that all processing cores 135 are available for execution in the data structure prior to initiating step 202. Subsequently, once scheduler 132 initiates execution of scheduled workloads, scheduler 132 can free up certain processing cores 135 and mark those processing cores 135, as described in step 208, such that memory bandwidth intensive workloads will not be scheduled to those processing cores 135 until a specified time.

If, scheduler 132 determines that all processing cores 135 are actively handling a scheduled workload ('yes' branch, decision 210), then scheduler 132 indicates to processor 134 to execute the scheduled workload in an SMT2 mode (step 218). Accordingly, by handling the workload in the SMT2 mode, processing cores 135 may perform a greater number of IPC's while handling the scheduled workload, whereby increasing a rate of completion for handling the computationally intensive scheduled workload. In another embodiment, scheduler 132 may indicate to processor 134 to execute the scheduled workloads in an SMT4 mode rather than an SMT2 mode. If, scheduler 132 determines that not all processing cores 135 are actively handling a scheduled workload ('no' branch, decision 210), then scheduler 132 continues handling any scheduled workloads in an ST mode for further execution of application 112 workloads (step 212). In one embodiment, scheduler 132 fixes the ST mode and number of processing cores 135 handling the scheduled workload and indicates that any remaining processing cores 135 are designated for handling computationally intensive workloads.

Scheduler 132 then monitors the variation in IPC performed by processor 134 and the average IPC performed by processor 134 (step 214). Scheduler 132 then determines whether the variance of IPC performed by processor 134 exceeds a specified threshold for the IPC variance (decision 216). If scheduler 132 determines that the specified threshold for the IPC variance is not exceeded ('no' branch, decision 216), then scheduler 132 continues to monitor the variation in IPC performed by processor 134 and the average IPC performed by processor 134, as described in step 214. If scheduler 132 determines that the specified threshold for the IPC variance is exceeded ('yes' branch, decision 216), then scheduler 132 continues to monitor memory latency cycles, memory bandwidth, and a number of IPC's performed while handling the scheduled workload, as described in step 204.

Figure 3:
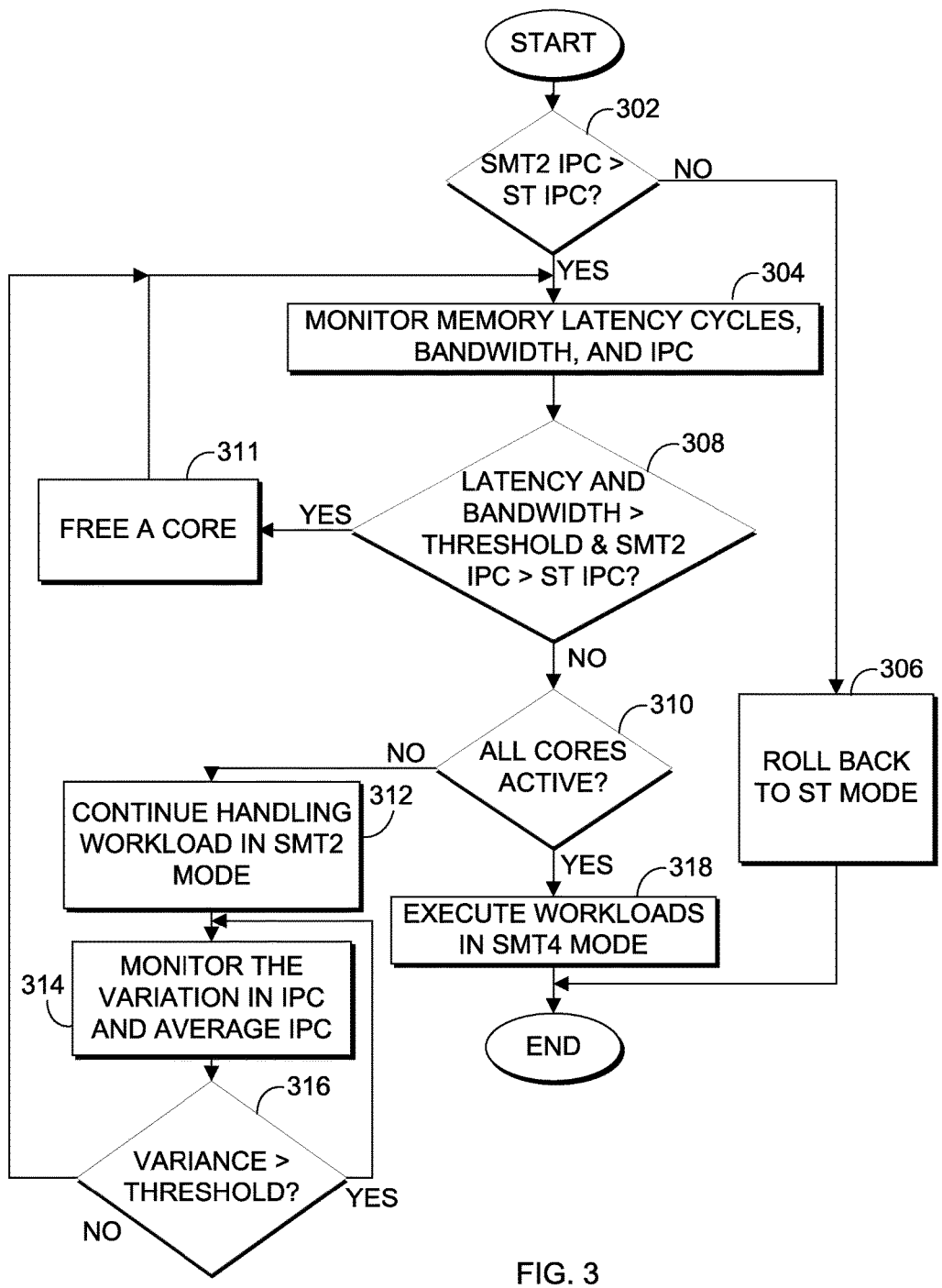
FIG. 3 is a flowchart illustrating operational steps for executing a workload in the cloud computing environment, in accordance with an embodiment of the present invention.

FIG. 3 is a flowchart illustrating operational steps for executing a workload in cloud computing environment 100, in accordance with an embodiment of the present invention. In this embodiment, the operational steps described in FIG. 3 are performed after completing the operational steps described in FIG. 2, with respect to handling a scheduled workload in an SMT2 mode (step 218 of FIG. 2).

After the workloads are scheduled to run in an SMT2 mode, scheduler 132 determines whether a monitored IPC of processor 134 running in an SMT2 mode is greater than the IPC of processor 134 running in an ST mode which was monitored in step 204 of FIG. 2 (decision 302). If, scheduler 132 determines that the monitored IPC of processor 134 running in an SMT2 mode is not greater than the IPC of processor 134 running in an ST mode ('no' branch, decision 302), then scheduler 132 rolls back the mode for handling the scheduled workload to an ST mode, such that processor 134 continues handling any scheduled workloads in an ST mode for further execution of application 112 workloads (step 306). In one embodiment, scheduler 132 fixes the ST mode and number of processing cores 135 handling the scheduled workload and indicates that any remaining processing cores 135 are designated for handling computationally intensive workloads. After the operational mode has been changed back to an ST mode, scheduler 132 may monitor the variation in IPC performed by processor 134 and the average IPC performed by processor 134, similar to that of step 214 of FIG. 2. Scheduler 132 may then determines whether the variance of IPC performed by processor 134 exceeds a specified threshold for the IPC variance, similar to that of decision 216 of FIG. 2. If scheduler 132 determines that the specified threshold for the IPC variance is not exceeded, then scheduler 132 may continue to monitor the variation in IPC performed by processor 134 and the average IPC performed by processor 134, as described in step 214 of FIG. 2. If scheduler 132 determines that the specified threshold for the IPC variance is exceeded, then scheduler 132 may continue to monitor memory latency cycles, memory bandwidth, and a number of IPC's performed while handling the scheduled workload, as described in step 204 of FIG. 2.

If, scheduler 132 determines that the monitored IPC of processor 134 running in an SMT2 mode is greater than the IPC of processor 134 running in an ST mode ('yes' branch, decision 302), then scheduler 132 monitors memory latency cycles, memory bandwidth, and a number of IPC's performed while handling the scheduled workload (step 304).

Scheduler 132 determines whether the monitored memory latency and memory bandwidth is greater than a specified threshold for the memory latency and the memory bandwidth and whether the monitored IPC is greater than the IPC of processor 134 operating in the ST mode (decision 308). If, scheduler 132 determines that the monitored memory latency and memory bandwidth is greater than the specified threshold for the memory latency and the memory bandwidth, and that the monitored IPC is greater than the IPC of processor 134 operating in the ST mode ('yes' branch, decision 308), then scheduler 132 indicates to processor 134 to free one of processing cores 135 (i.e., make available), such that the one of processing cores 135 will not continue handling the current workload, until indicated otherwise (step 311). Stated differently, one of the processing core 135 is marked or indicated as a free, whereby terminating any workload tasks for the currently scheduled workload executed on the free processing core 135. If, scheduler 132 determines that the monitored memory latency and memory bandwidth is not greater than the specified threshold for the memory latency and the memory bandwidth, and/or that the monitored IPC is greater than the IPC of processor 134 operating in the ST mode ('no' branch, decision 308), then scheduler 132 determines whether all processing cores 135 are actively handling a scheduled workload (decision 310), similar to that of decision 210 of FIG. 2.

If, scheduler 132 determines that all processing cores 135 are actively handling a scheduled workload ('yes' branch, decision 310), then scheduler 132 indicates to processor 134 to execute the scheduled workload in an SMT4 mode (step 318). Accordingly, by handling the workload in the SMT4 mode, processing cores 135 may perform a greater number of IPC's while handling the scheduled workload, whereby increasing a rate of completion for handling the computationally intensive scheduled workload. In another embodiment, scheduler 132 may indicate to processor 134 to execute the scheduled workloads in an SMT2 mode rather than an SMT4 mode, if processor 134 was previously operating in an SMT4 mode. If, scheduler 132 determines that not all processing cores 135 are actively handling a scheduled workload ('no' branch, decision 310), then scheduler 132 continues to handle the workload in the SMT2 mode, such that scheduler 132 fixes (e.g., maintains) the SMT2 mode and number of processing cores 135 handling the scheduled workload (step 312), similar that of step 212 of FIG. 2.

Scheduler 132 then monitors the variation in IPC performed by processor 134 and the average IPC performed by processor 134 (step 314). Scheduler 132 then determines whether the variance of IPC performed by processor 134 exceeds a specified threshold for the IPC variance (decision 316). If scheduler 132 determines that the specified threshold for the IPC variance is not exceeded ('no' branch, decision 316), then scheduler 132 continues to monitor the variation in IPC performed by processor 134 and the average IPC performed by processor 134, as described in step 314. If scheduler 132 determines that the specified threshold for the IPC variance is exceeded ('yes' branch, decision 316), then scheduler 132 continues to monitor memory latency cycles, memory bandwidth, and a number of IPC's performed while handling the scheduled workload, as described in step 304. Furthermore, in additional embodiments similar operational steps may be performed by scheduler 132 to operate processor 134 in an SMT4 and/or SMT8 mode, as described with respect to FIGS. 2 and 3.

Figure 4:
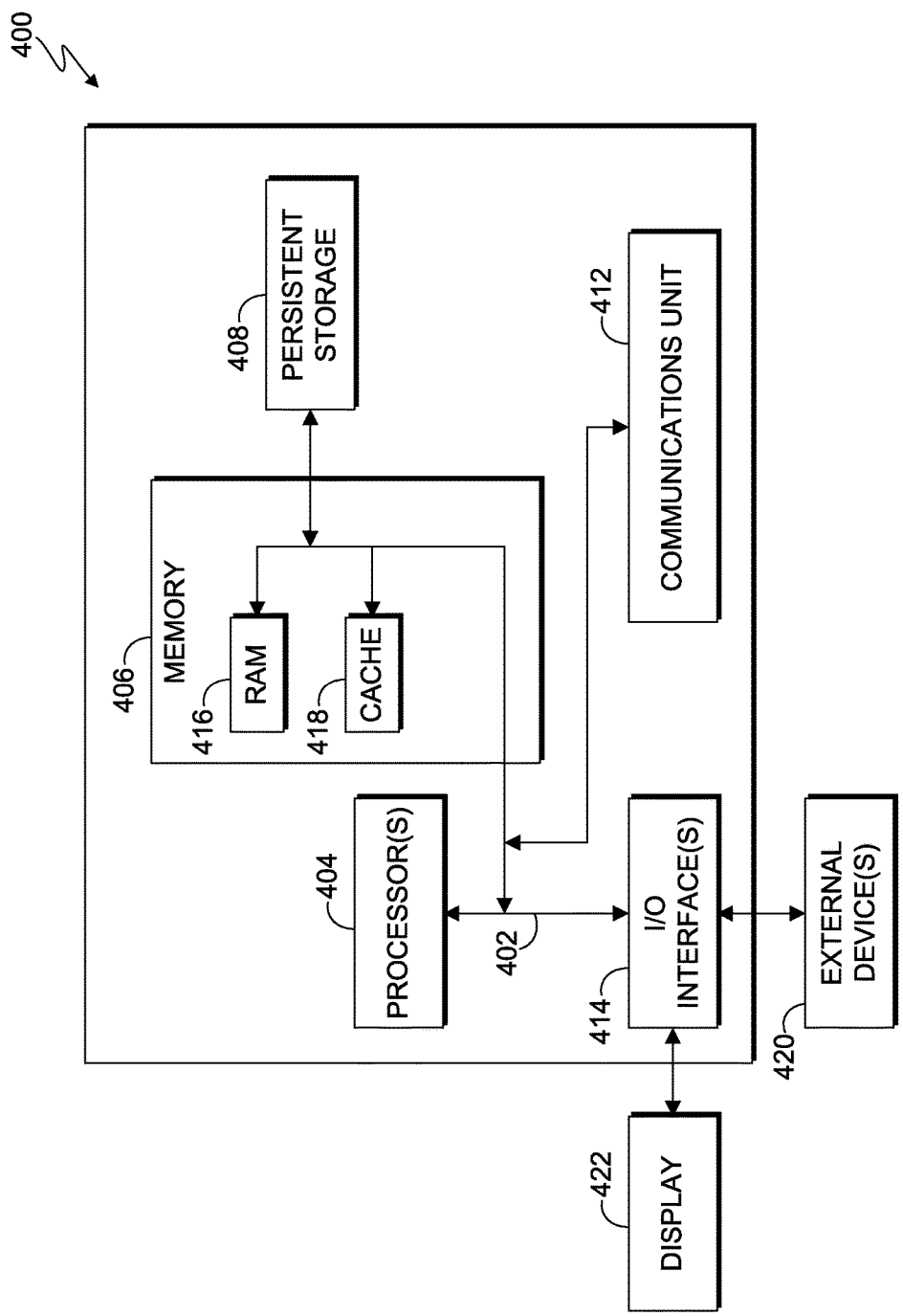
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
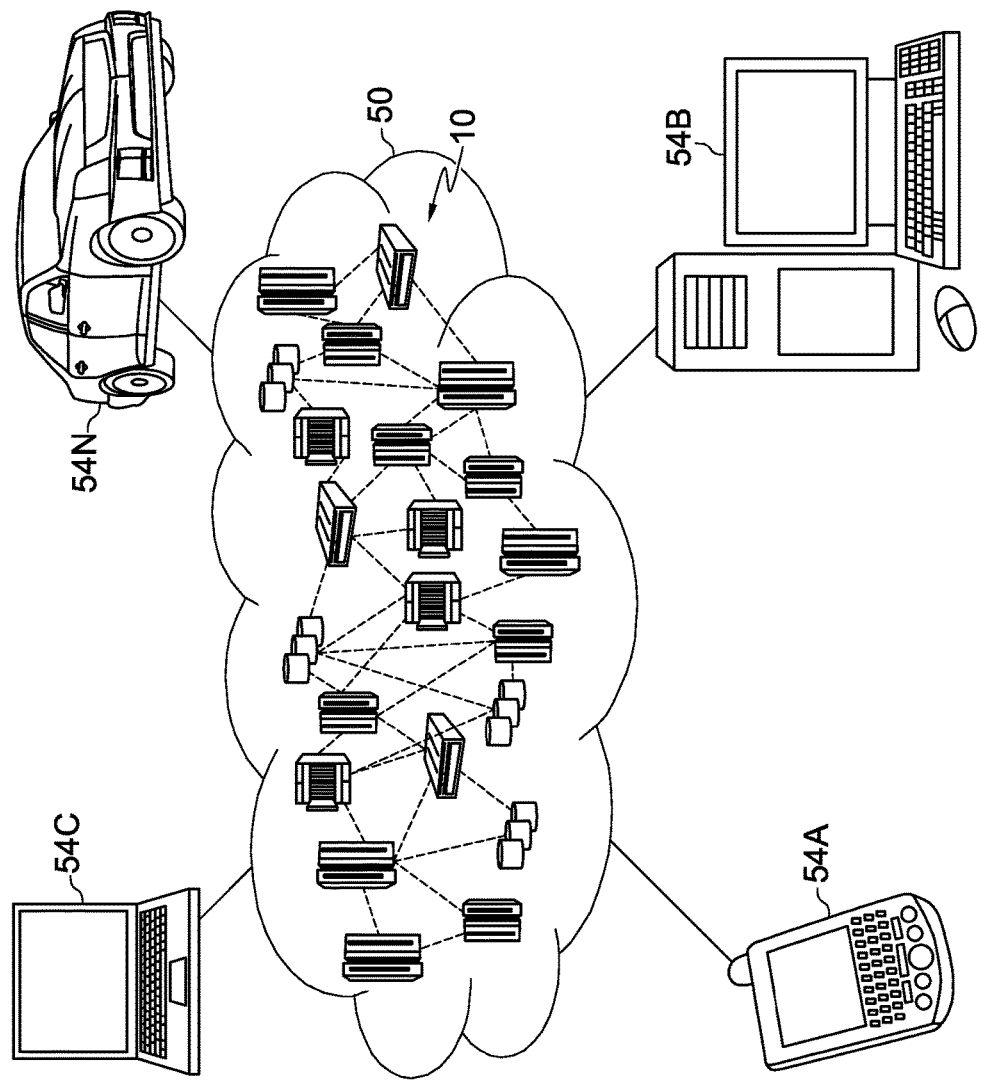
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 6:
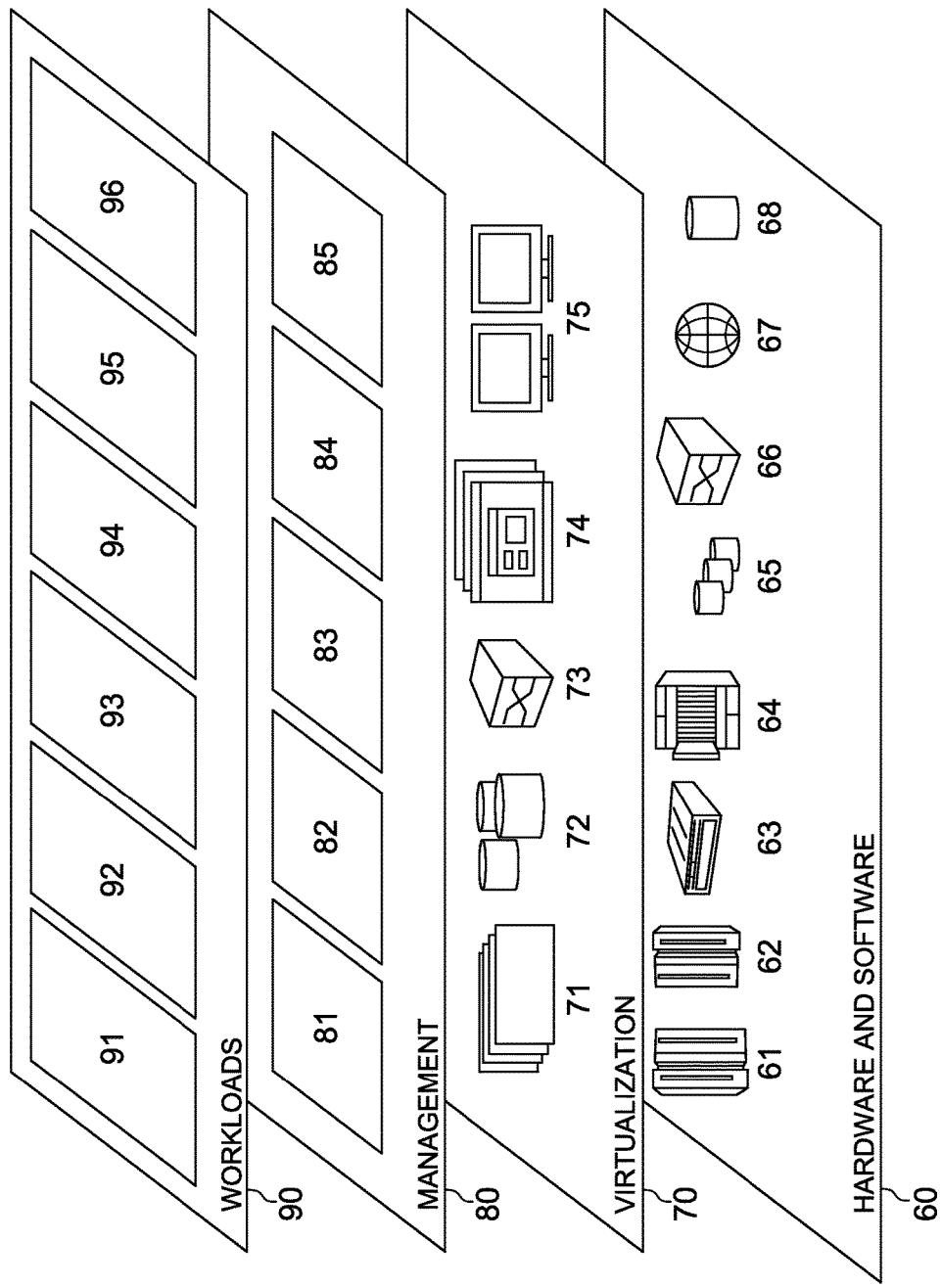
FIG. 6 depicts abstraction model layers, in accordance with an embodiment of the present invention.

Referring now to FIG. 6, a set of functional abstraction layers provided by cloud computing environment 50 (FIG. 5) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud computing environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    scheduling, by a scheduler, an application workload for execution by each of one or more processing cores operating in a first mode, wherein a number of threads in each of the one or more processing cores executes the scheduled workload in accordance with the first mode;
    monitoring, by the scheduler, performance metrics for the each of the one or more processing cores and a memory component, wherein the memory component stores data for the one or more processing cores to carry out instructions to complete the scheduled workload, wherein the monitored performance metrics includes a first number of instructions per cycle (IPCs) performed by the processor operating in a simultaneous multi-threading (SMT) mode and a second number of IPCs performed by the processor operating in a single thread (ST) mode;
    comparing the first number of IPCs performed by the processor operating in the SMT mode to a second number of IPCs performed by the processor operating in the ST mode;
    responsive to determining that the first number of IPCs performed is not greater than a second number of IPCs performed, monitoring, by the scheduler, the performance metrics for the processor and the memory component while handling the scheduled workload in the SMT mode;
    responsive to determining that the first number of IPCs performed is not greater than the second number of IPCs performed, maintaining, by the scheduler, that a number of processing cores handling the scheduled workload is to remain constant;
    responsive to determining that the performance metrics are greater than a specified threshold, reducing, by the scheduler, a number of the one or more processing cores handling the scheduled workload;
    responsive to determining that the performance metrics are not greater than the specified threshold, determining, by the scheduler, whether each of the processing cores of the processor is currently handling a scheduled workload; and
    responsive to determining that each of the processing cores of the processor is currently handling the scheduled workload, configuring, by the scheduler, the processor to operate in a second mode, wherein the number of threads in each of the one or more processing cores executes the scheduled workload in accordance with the second mode.

2. The method of claim 1, wherein the performance metrics include one or more performance metrics selected from the group consisting of: memory latency cycles of the memory component and memory bandwidth available by the memory component.

3. The method of claim 1, wherein the specified threshold represents a value for determining whether the scheduled workload is a first type of workload requiring a greater amount of resources of the memory component.

4. The method of claim 1, further comprising:
    responsive to determining that the monitored performance metrics for the processor and the memory component while handling the scheduled workload in the SMT mode meet a first condition, making available, by the scheduler, a processing core of the processor;
    responsive to determining that the monitored performance metrics for the processor and the memory component while handling the scheduled workload in the SMT mode do not meet the first condition, determining, by the scheduler, whether each of the processing cores of the processor is currently handling the scheduled workload; and
    responsive to determining that each of the processing cores of the processor is currently handling the scheduled workload, designating, by the scheduler, the processor to operate in another SMT mode.

5. The method of claim 1, further comprising:
    responsive to determining that each of the processing cores of the processor is not currently handling the scheduled workload, indicating, by the scheduler, that the number of processing cores handling the scheduled workload is to remain constant and that the remaining processing cores are designated for handling a second type of workload requiring a greater amount of the processors resources.

6. The method of claim 4, wherein the first condition is met when the monitored memory latency and memory bandwidth for the memory component while handling the scheduled workload in the ST mode is greater than the respective specified threshold's and whether the monitored IPC of the processor while handling the scheduled workload in the SMT mode is greater than the monitored IPC of the processor while handling the scheduled workload in the ST mode.

7. A computer program product comprising:
    one or more computer readable storage media and program instructions stored on the one or more computer readable storage media, the program instructions comprising:
    program instructions to schedule an application workload for execution by each of one or more processing cores operating in a first mode, wherein a number of threads in each of the one or more processing cores executes the scheduled workload in accordance with the first mode;
    program instructions to monitor performance metrics for the each of the one or more processing cores and a memory component, wherein the memory component stores data for the one or more processing cores to carry out instructions to complete the scheduled workload, wherein the monitored performance metrics includes a first number of instructions per cycle (IPCs) performed by the processor operating in a simultaneous multithreading (SMT) mode and a second number of IPCs performed by the processor operating in a single thread (ST) mode;

program instructions to compare the first number of IPCs performed by the processor operating in the SMT mode to a second number of IPCs performed by the processor operating in the ST mode;

program instructions to, responsive to determining that the first number of IPCs performed is not greater than a second number of IPCs performed, monitor, by the scheduler, the performance metrics for the processor and the memory component while handling the scheduled workload in the SMT mode;

program instructions to, responsive to determining that the first number of IPCs performed is not greater than the second number of IPCs performed, maintain, by the scheduler, that a number of processing cores handling the scheduled workload is to remain constant;

program instructions to, responsive to determining that the performance metrics are greater than a specified threshold, reduce a number of the one or more processing cores handling the scheduled workload;

program instructions to, responsive to determining that the performance metrics are not greater than the specified threshold, determine whether each of the processing cores of the processor is currently handling a scheduled workload; and program instructions to, responsive to determining that each of the processing cores of the processor is currently handling the scheduled workload, configure the processor to operate in a second mode, wherein the number of threads in each of the one or more processing cores executes the scheduled workload in accordance with the second mode.

8. The computer program product of claim 7, wherein the performance metrics include one or more performance metrics selected from the group consisting of: memory latency cycles of the memory component and memory bandwidth available by the memory component.

9. The computer program product of claim 7, wherein the specified threshold represents a value for determining whether the scheduled workload is a first type of workload requiring a greater amount of resources of the memory component.

10. The computer program product of claim 7, wherein the program instructions stored on the one or more computer readable storage media further comprise:

program instructions to, responsive to determining that the monitored performance metrics for the processor and the memory component while handling the scheduled workload in the SMT mode meet a first condition, making available a processing core of the processor;

program instructions to, responsive to determining that the monitored performance metrics for the processor and the memory component while handling the scheduled workload in the SMT mode do not meet the first condition, determine whether each of the processing cores of the processor is currently handling the scheduled workload; and program instructions to, responsive to determining that each of the processing cores of the processor is currently handling the scheduled workload, designate the processor to operate in another SMT mode.

11. The computer program product of claim 7, wherein the program instructions stored on the one or more computer readable storage media further comprise:

program instructions to, responsive to determining that each of the processing cores of the processor is not currently handling the scheduled workload, indicate that the number of processing cores handling the scheduled workload is to remain constant and that the remaining processing cores are designated for handling a second type of workload requiring a greater amount of the processors resources.

12. The computer program product of claim 10, wherein the first condition is met when the monitored memory latency and memory bandwidth for the memory component while handling the scheduled workload in the ST mode is greater than the respective specified threshold's and whether the monitored IPC of the processor while handling the scheduled workload in the SMT mode is greater than the monitored IPC of the processor while handling the scheduled workload in the ST mode.

13. A computer system comprising:

one or more computer processors;

one or more computer readable storage media;

program instructions stored on the one or more computer readable storage media for execution by at least one of the one or more processors, the program instructions comprising:

program instructions to schedule an application workload for execution by each of one or more processing cores operating in a first mode, wherein a number of threads in each of the one or more processing cores executes the scheduled workload in accordance with the first mode;

program instructions to monitor performance metrics for the each of the one or more processing cores and a memory component, wherein the memory component stores data for the one or more processing cores to carry out instructions to complete the scheduled workload, wherein the monitored performance metrics includes a first number of instructions per cycle (IPCs) performed by the processor operating in a simultaneous multi-threading (SMT) mode and a second number of IPCs performed by the processor operating in a single thread (ST) mode;

program instructions to compare the first number of IPCs performed by the processor operating in the SMT mode to a second number of IPCs performed by the processor operating in the ST mode;

program instructions to, responsive to determining that the first number of IPCs performed is not greater than a second number of IPCs performed, monitor, by the scheduler, the performance metrics for the processor and the memory component while handling the scheduled workload in the SMT mode;

program instructions to, responsive to determining that the first number of IPCs performed is not greater than the second number of IPCs performed, maintain, by the scheduler, that a number of processing cores handling the scheduled workload is to remain constant;

program instructions to, responsive to determining that the performance metrics are greater than a specified threshold, reduce a number of the one or more processing cores handling the scheduled workload;

program instructions to, responsive to determining that the performance metrics are not greater than the specified threshold, determine whether each of the processing cores of the processor is currently handling a scheduled workload; and program instructions to, responsive to determining that each of the processing cores of the processor is currently handling the scheduled workload, configure the processor to operate in a second mode, wherein the number of threads in each of the one or more processing cores executes the scheduled workload in accordance with the second mode.

14. The computer system of claim 13, wherein the performance metrics include one or more performance metrics selected from the group consisting of: memory latency cycles of the memory component and memory bandwidth available by the memory component.

15. The computer system of claim 13, wherein the specified threshold represents a value for determining whether the scheduled workload is a first type of workload requiring a greater amount of resources of the memory component.

16. The computer system of claim 13, wherein the program instructions stored on the one or more computer readable storage media further comprise:
program instructions to, responsive to determining that the monitored performance metrics for the processor and the memory component while handling the scheduled workload in the SMT mode meet a first condition, making available a processing core of the processor;
program instructions to, responsive to determining that the monitored performance metrics for the processor and the memory component while handling the scheduled workload in the SMT mode do not meet the first condition, determine whether each of the processing cores of the processor is currently handling the scheduled workload; and
program instructions to, responsive to determining that each of the processing cores of the processor is currently handling the scheduled workload, designate the processor to operate in another SMT mode.

17. The computer system of claim 13, wherein the program instructions stored on the one or more computer readable storage media further comprise:
program instructions to, responsive to determining that each of the processing cores of the processor is not currently handling the scheduled workload, indicate that the number of processing cores handling the scheduled workload is to remain constant and that the remaining processing cores are designated for handling a second type of workload requiring a greater amount of the processors resources.

* * * * *